Feb. 21, 1933.  F. E. DADD  1,898,869
BRAKE MECHANISM
Filed Jan. 30, 1929    4 Sheets-Sheet 1
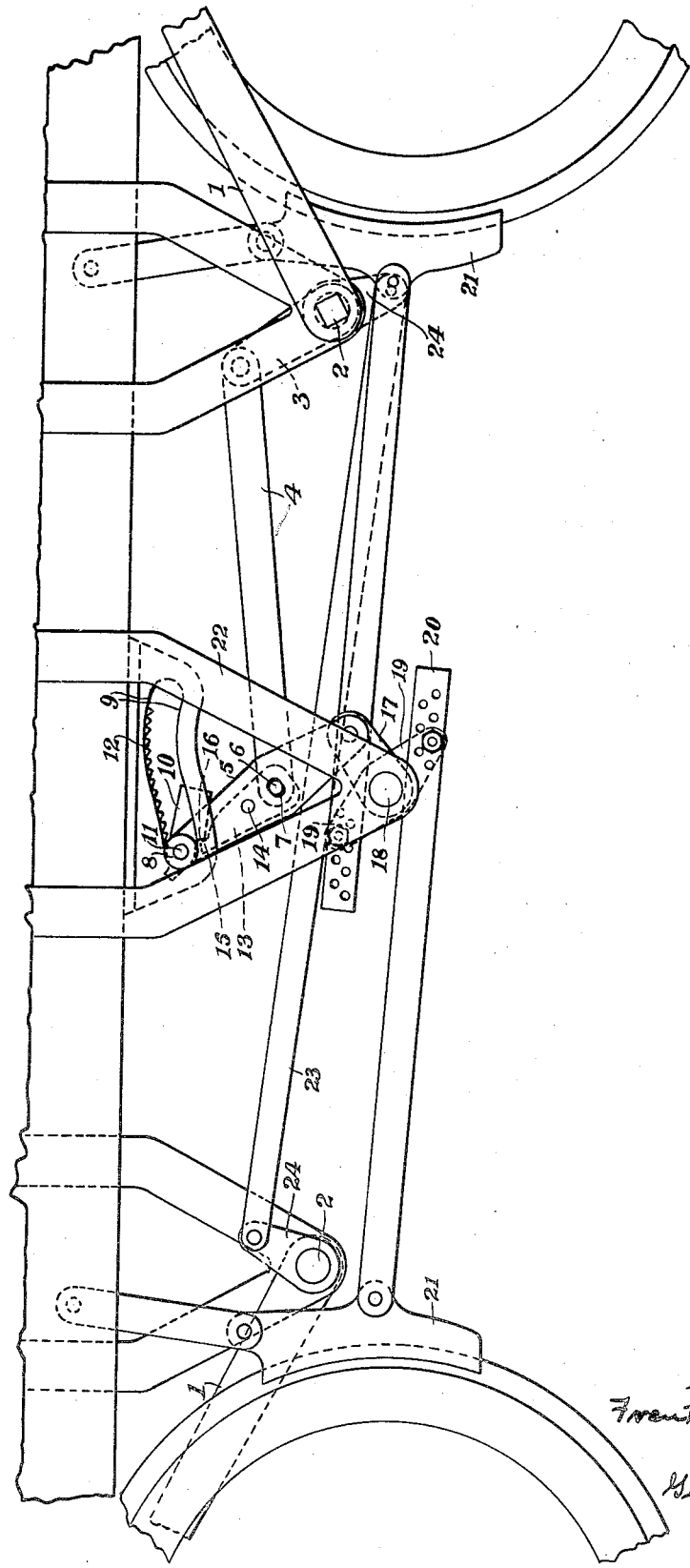
Inventor.
Frank E. Dadd
By George A. Prevost
Atty

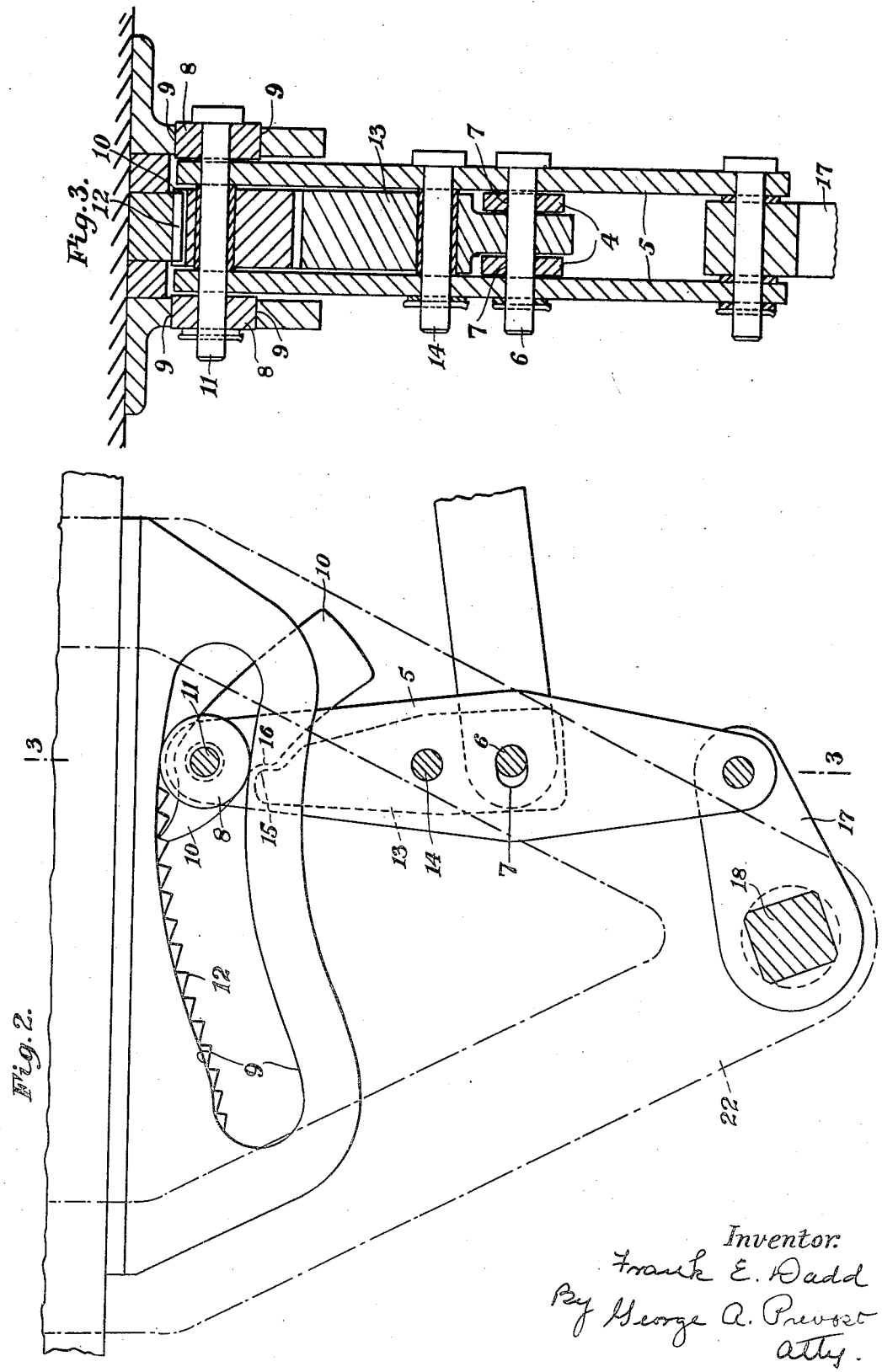

Feb. 21, 1933.  F. E. DADD  1,898,869
BRAKE MECHANISM
Filed Jan. 30, 1929   4 Sheets-Sheet 3
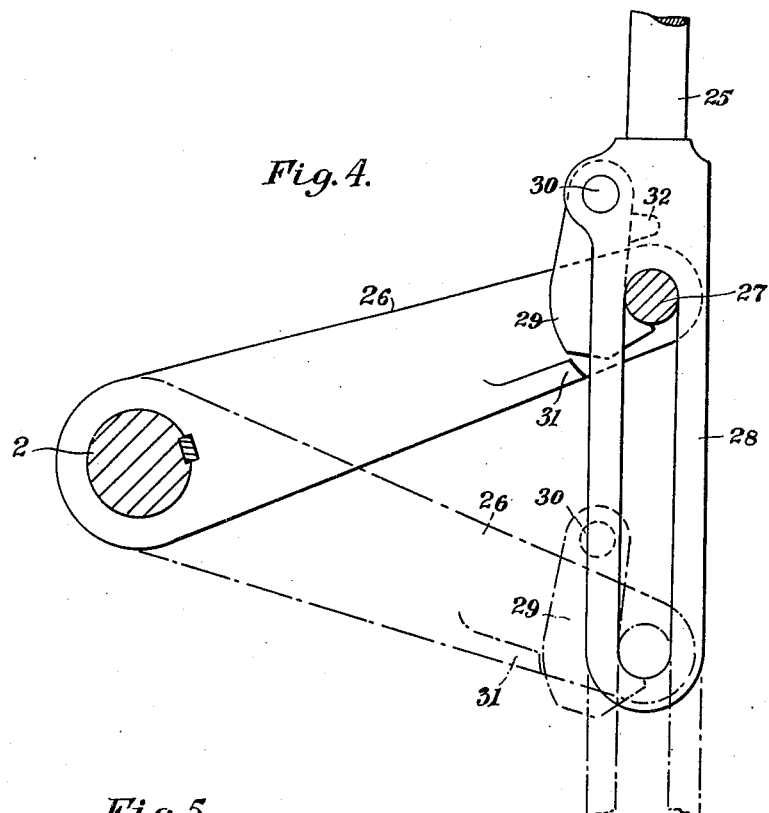
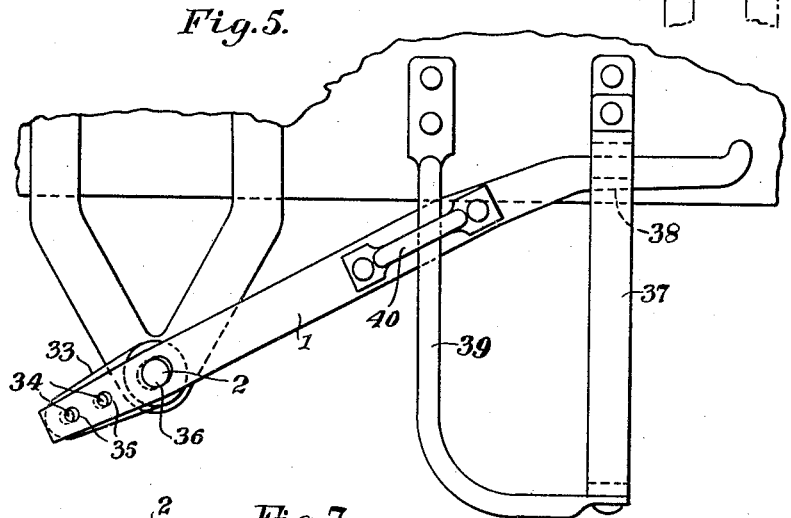
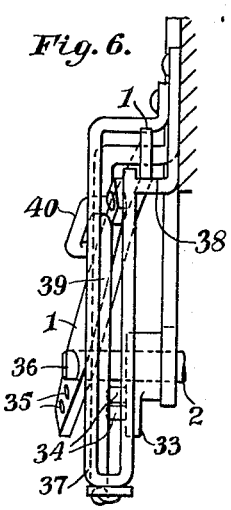
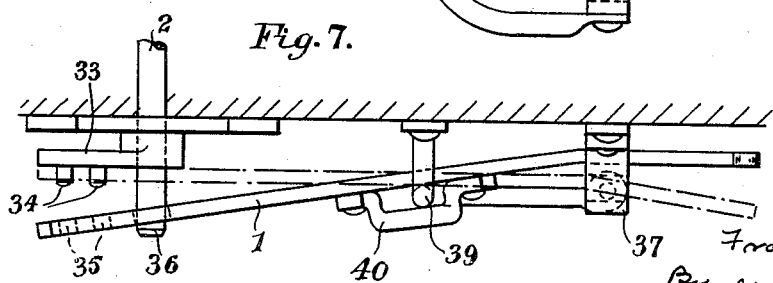

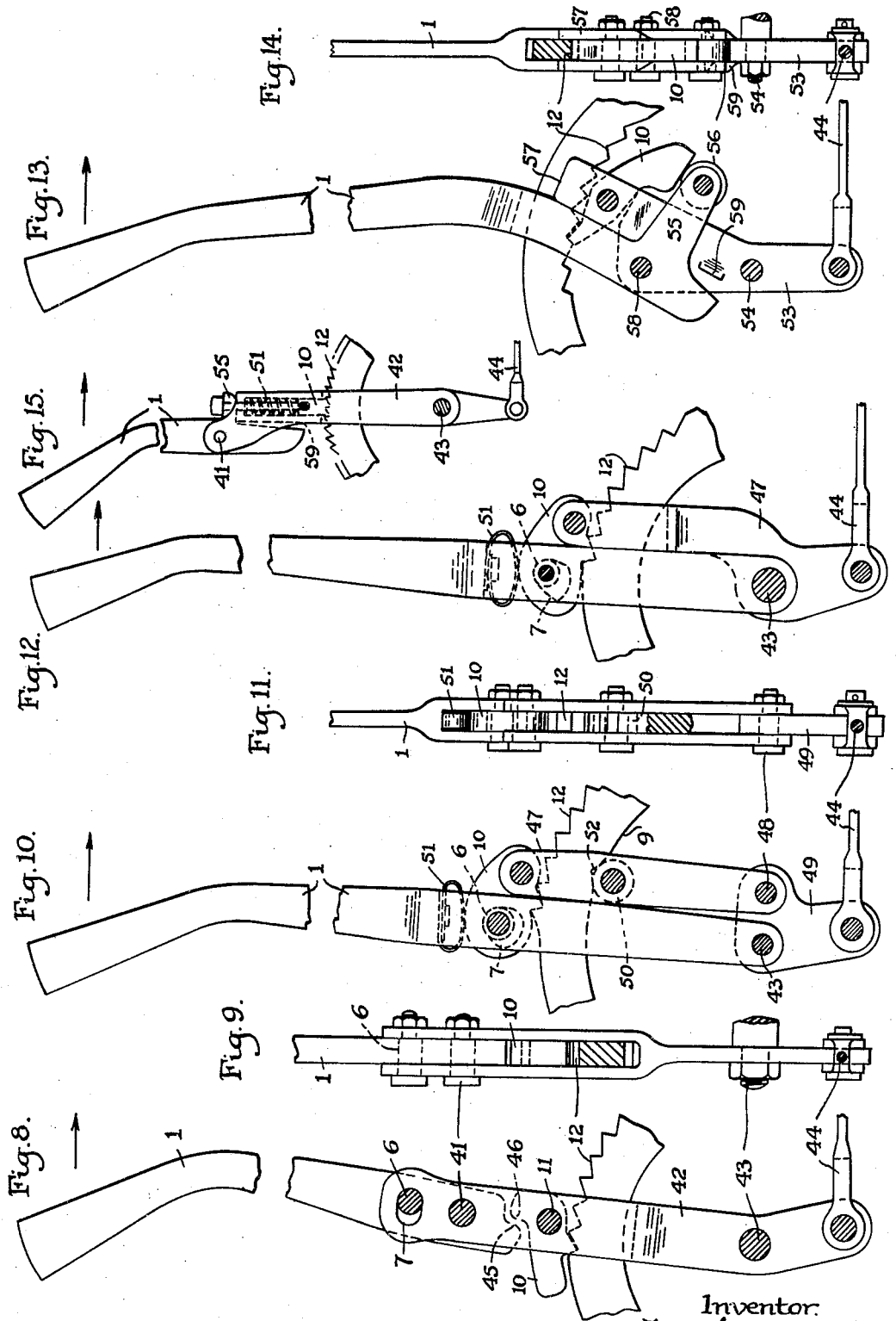

Patented Feb. 21, 1933

1,898,869

UNITED STATES PATENT OFFICE

FRANK ERIC DADD, OF BEDFORD, ENGLAND, ASSIGNOR OF ONE-HALF TO JOSEPH THOMAS SHEVLIN, OF LONDON, ENGLAND

BRAKE MECHANISM

Application filed January 30, 1929, Serial No. 336,170, and in Great Britain January 30, 1928.

This invention relates to brake mechanism designed more particularly for the wheels of vehicles of the type wherein a brake-lever is swung about an axis to effect the braking of one or more pairs of wheels through link mechanism.

To apply the brakes the usual practice has been to employ a hand-lever suitably pivoted and maintained in the "on" position by means of a pin or pawl which is arranged to engage with one of a series of holes or notches.

With this arrangement of hand-lever, as applied to railway vehicles, the brakes can only be released from one side of the vehicle, namely, that on which the securing pin or pawl is located and the operator has to use both hands for this purpose, one to release the securing pin and the other manipulate the lever. Further, when a brake hand-lever is employed in connection with motor road vehicles two movements have been necessary to release the brakes, one to remove the pawl from its co-acting rack and the other to move the hand-lever to the off position.

According to the present invention there is provided in brake mechanism of the kind hereinbefore referred to, a rack and pawl mechanism operatively connected to the brake lever in such a manner that when the lever is moved in the direction of the "on" position, the brake may be automatically locked by the said mechanism in any desired position against movement in the reverse direction and automatically unlocked for movement in the reverse direction by an initial movement of the lever towards the "off" position.

In a suitable arrangement for carrying the invention into effect, the brake hand-lever or its equivalent is connected to the cross-shaft, which latter, through the medium of a crank mounted thereon and a connecting-rod, communicates movement to a link connected to the said rod by a pin and slot connection and provided at its upper end with a roller or rollers engaging on a fixed guide. A pawl in the form of a counterweighted lever is pivotally mounted at the upper end of the said link and preferably on the pivot of the roller or rollers and either concentric therewith or eccentric thereto. The pawl is caused by the counterweight, or by a spring, to engage with the teeth of a rack, which is disposed above the said link and is of the same contour as the fixed guide, the reaction of the brakes maintaining the roller or rollers in contact with the guide and consequently the pawl in position to co-act with the rack.

The pawl is held out of engagement with the rack by the hand-lever through the medium of the connecting-rod above referred to and a double armed lever fulcrumed on the link, one arm of which lever engages a recess in the pawl and providing lost motion between the said lever and pawl.

In order that the brakes may be applied by power independently of their manual operation and vice versa, the cross shaft, by the rotation of which the braking is effected, is connected to the plunger of a power mechanism by a lever or arm on the said shaft through the medium of means which, when the brake mechanism is in the "off" position, will allow the said lever to disengage itself from the plunger if the hand-lever be manipulated to apply the brakes, and to re-engage automatically with the plunger when the lever is returned to the normal position.

For example, with power mechanism employing a brake cylinder the piston of which is operated by fluid pressure, the lever or arm connected to the cross-shaft engages by means of a pin at its outer end, a slotted bar attached to and aligning with the piston rod of the power mechanism. The pin on the lever or arm when the latter is in the "off" position bears against the upper end of the slot of the link and is coupled to the latter by a hook-shaped catch, so formed that when the said lever or arm is in the "off" position, the operation by the hand lever to apply the brakes will tend to move the lever or arm and cause the pin thereon to move the catch to one side, so that the further movement of the said lever or arm is unobstructed, the pin thereon travelling in the slotted link. On return of the hand-lever to the "off" position, the pin on the lever or arm again moves the catch to one side and engages the hook-shaped catch.

In applying the invention to brakes for use on motor road vehicles a hand lever is pivotally connected to a link, which is pivoted to the frame of the machine and carries a pawl, arranged to co-act with a rack. A pin and slot connection is provided between the hand lever and the link so as to provide a certain amount of lost motion, the inner end of the hand lever being formed with a nose adapted to actuate the pawl and disengage the same from the rack. The link is pivotally connected to the brakes through the medium of a brake rod.

In a modification of the invention as applied to vehicle hand brakes, the pawl may be connected to the hand lever through a pin and slot connection, the lower end of the hand lever being pivotally connected to the frame of the machine. In addition the pawl is connected to the hand lever through the medium of a link parallel therewith, one end of which is connected to the hand lever through the medium of a plate member operatively connected to the brake-rod of the vehicle.

In a further modification of the invention the hand lever is pivotally connected to one end of a link pivoted on the frame of the machine, the other end of which is operatively connected to the brake-rod thereof, the hand lever being provided with an extension arranged to carry a roller adapted to contact with the weighted end of the pawl which is pivoted to an extension on the said link.

In order that the invention may be understood, reference will be made to the accompanying drawings wherein:—

Figure 1 is a diagrammatic elevation of a hand operated braking system according to the invention with the brake shoes shown in the inoperative position.

Figure 2 is the view of a detail on an enlarged scale showing the position of the mechanism with the brakes in the operative position.

Figure 3 is a section on the line 3—3, Figure 2.

Figure 4 is a view showing the connection employed between the brake mechanism and the plunger of the power operating mechanism.

Figure 5 is a modification showing the method of connecting the hand operated lever to the braking system.

Figure 6 is an end elevation thereof, and

Figure 7 is a plan view of the same.

Figure 8 is a side elevation of a hand operated brake mechanism constructed in accordance with the invention for use with motor road vehicles.

Figure 9 is a sectional view at right angles to Figure 8.

Figure 10 is a view similar to Figure 8 illustrating a modification.

Figure 11 is a view at right angles to Figure 10.

Figure 12 is a modification of the construction shown in Figure 10.

Figure 13 is a side elevation of a further modification of a brake mechanism as applied to a road vehicle and Figure 14 is a view at right angles to Figure 13.

Figure 15 is a side elevation of a further modification of the invention as applied to a road vehicle.

Referring to Figures 1 to 3 of the drawings, 1 is a brake hand lever, which is connected to a cross shaft 2 which latter through the medium of a crank arm 3, and a connecting rod 4 communicates movement to a pair of links 5, connected to the rod 4 by means of a pin 6 provided on the said rod co-acting with slots 7 in the links. The links 5 are provided at the upper ends thereof with rollers 8 designed to roll in fixed cam guides 9. A pawl 10 having a counterweighted arm is pivotally mounted on the upper end of the links 5 and preferably on the pivot 11 which carries the rollers 8. The pawl 10 is caused by the counterweight thereof to engage with the teeth of a rack 12, which is disposed above and between and is of the same contour as the cam guides 9. The reaction of the brakes maintains the rollers 8 in contact with the upper surface of the guides 9 and consequently maintains also the pawl 10 in position to coact with the rack 12. The pawl 10 is held out of engagement with the rack 12 through the medium of the connecting rod 4 and the double armed lever 13 pivoted at 14, on the links 15. One end of the lever 13 is provided with a shoulder 15 designed to co-act with a recess 16 on the pawl 10.

The links 5 are connected to a double bell-cranked lever formed by a crank arm 17 secured to an oscillating cross shaft 18 which carries a double armed lever 19, each arm of which is connected to the brake rods 20, 20 which in turn are connected to brake shoes 21, 21. The cross shaft 18 is supported by hangers 22 carried by the vehicle.

In order to apply the brakes from either side of the truck, the brake hand levers are interconnected by means of a rod 23 which is connected to the cross shafts 2, 2 by means of crank arms 24, 24.

In applying the brakes it will be seen that when the pawl 10 is drawn over the toothed rack 12 by the hand lever 1, the lost motion between the pawl and the lever 13 will allow the pawl to ride over the teeth of the rack, so that, if the hand-lever is released, the weight or spring of the pawl will allow the same automatically to engage with the rack and hold the brakes in the "on" position. By moving the hand-lever in the opposite direction to that required for applying the brakes, the connecting-rod attached to the said lever, will first move in the slots 7 in the links 5 carrying the pawl without consequently moving the said link, but moving the lever 13 to disengage the pawl from the rack, the continued movement of the hand-lever then being imparted to the links 5 to release the brakes. It will be seen that the cam guides 9, co-operating with the rollers 8 and the links 5, increase the leverage of the lever system and also take the strain of opposing forces, thus relieving the lever 1 of strain when the brakes are applied.

Referring to Figure 4 which shows an arrangement for operating the brakes by power mechanism employing a brake cylinder, the plunger of which is operatively connected to a rod 25 which is designed to actuate a crank arm 26 secured to the cross shaft 2. The crank arm 26 engages by means of a pin 27, at its outer end a slotted member 28 forming an extension of the rod 25. The pin 27 on the crank arm, when the latter is in the normal or "off" position, bears against the end of the slotted link and being coupled to the latter by a hook shaped catch 29 pivoted at 30 to the member 28. The catch 29 is so shaped that when the pin 27 is at the top of the slot, the operation of the hand lever to apply the brakes will move the crank arm and cause the pin thereof to move the catch to one side, whereby a further movement of the crank-arm is unobstructed, the pin travelling down the slot. On return of the hand lever to the normal or "off" position, the pin 27 moves the catch to one side and is again retained in position. When the brake is applied by power, that is, when the rod 25 is moved downwardly to rotate the cross-shaft 2, the pin is moved down owing to its contact with the end of the slotted member 28; as, however, there is a tendency for the catch 29 to disengage itself automatically from the pin 27 there is provided an abutment 31 on the crank-arm 26 which acts to retain the said catch during the return of the said arm 26 to the "off" position. The catch 29 is allowed freedom of movement, when it arrives at the end of its upward movement and owing to the change of angle of the arm hangs free. In order to prevent the catch 29 from swinging too far inwardly and thus prevent the pin 27 riding over the nose of said catch when the brakes are operated by hand, there is provided an abutment 32 upon the slotted extension 28 which prevents inward movement of the catch 29.

Referring now to Figures 5, 6 and 7 which show an arrangement by means of which the hand levers on each side of a truck are so mounted as to be engaged or disengaged at will from the cross-shaft 2, whereby it is possible to operate the brake mechanism from either side of the vehicle. The cross-shaft 2 has secured thereto a crank-arm 33 provided with a pair of pins 34 which are designed to co-act with apertures 35 provided in the hand lever 1, which latter is pivoted on an extension 36 of the cross-shaft 2 and is designed to be oscillated thereon vertically in the guide 37 secured to the body of the truck. The guide 37 is formed with a step 38 upon which the hand lever 1 rests when the brakes are in the inoperative position.

The hand lever 1 is adapted to be rocked on a member 39 which is secured at one end to the vehicle and at the other end is bent to form a support for the guide 37. A bridge-piece 40 on the hand lever embraces the member 39 and serves to guide the said hand lever in its up and down movement and during the time it is rocked on the member 39, which serves as a fulcrum for the said rocking movement. It will be seen, therefore, that when it is required to operate the brakes from either side of the vehicle or truck and assuming that both hand levers are in an inoperative position, the hand lever 1 is moved from the step 38 outwardly, which action rocks the lever on the member 39 and engages the perforations 35 with the pins 34 thus locking the hand lever to the arm 33. A downward movement of the hand lever will then actuate the brakes through the mechanism previously described.

In a modification of the invention the double armed lever 13 may be dispensed with and the pawl connected directly to the connecting rod or to the hand lever itself by a pin and slot connection.

Referring now to Figures 8 and 9 which show the application of the invention to a motor road vehicle. In this instance, the hand lever 1 is pivotally connected at 41 to a lever 42 which is itself pivoted at 43 to the frame of the machine and operably connected to the brakes of the vehicle through the medium of the brake rod 44. The hand lever 1 is, in addition, connected to the lever 42 through the medium of the pin 6 thereon and the slot 7 in the lever 42, the pawl 10 being pivoted at 11 to the lever 42.

In the operation of this construction the hand lever 1, when moved in the direction of the arrow, to apply the brakes will cause the pin 6 to engage with the right-hand end of the slot 7 and will move the link 42 and draw the pawl 10 thereon over the rack 12. A reverse movement of the hand lever 1 will first move the pin 6 in the slot 7 and the nose 45 formed on the end of the hand lever 1 will engage with the nose 46 on the pawl 10 and trip the latter, whereby it is disengaged from the rack 12 to permit the continued movement of the hand-lever to release the brakes.

Referring now to Figures 10 and 11, in this instance the hand lever 1 is pivoted directly to the frame of the machine at 43 and is connected to the pawl 10 by means of the slot 7 therein arranged to co-act with the pin 6 on the hand lever. The pawl is in addition pivoted to one end of a link 47 the other end of which is pivoted at 48 to a plate member 49 to which in addition the brake-rod 44 is connected. The link 47 is provided with a roller 50 adapted to ride upon a cam surface 9, forming part of the rack 12. A spring 51 is provided to maintain the pawl 10 in engagement with the rack.

In the operation of this arrangement, when the hand lever 1 is moved in the direction of the arrow to apply the brakes the pawl 10 is caused to ride over the rack 12 and the link 47 is thereby constrained to move downwardly and oscillate the member 49, pivoted at 43, whereby the rod 44 is moved to apply the brakes. It will be noted that the cam surface 9 is provided with a recess 52 which has the effect of giving a quick initial movement to the link 47 whereby the brakes are caused to move quickly over a short distance and thereafter when the roller 50 passes on to and over the cam surface 9 to move more slowly. On the return movement of the hand lever to release the brakes the pin 6 rides in the slot 7 and causes the pawl 10 to be disengaged from the rack 12, whereby the further movement of the hand lever is unrestricted.

Figure 12 is a similar view to Figure 10, the link 47 however, in this case, being formed as an integral part of the plate 49 and the roller and cam surface being dispensed with, the operation of the pawl however, being similar to the operation thereof described in connection with Figures 10 and 11.

Figures 13 and 14 show a further modification of the invention as applied to the mechanism of motor road vehicles and wherein the hand-lever 1 is operatively connected to one end of a lever 53, itself pivoted to the frame of the machine at 54 and the other end of which is connected to the brake rod 44. The hand-lever 1 is provided with an extension 55 carrying a roller 56 arranged to engage the weighted end of the pawl 10 which is carried on an extension 57 of the lever 53. When the hand-lever is being moved to apply the brakes in the direction of the arrow the pawl 10 rides freely over the rack 12. On the reverse movement of the hand-lever to release the brakes, the hand-lever first moves on the pivot 58 causing the extension arm 55 to move the roller 56 into engagement with the pawl 10, whereby the latter is removed from engagement with the rack 12. A continued movement of the hand-lever 1 brings the lower end thereof into engagement with the abutment 59, whereby the lever 53 is caused to move about its pivot 54 and carry therewith the pawl 10 which is now free of the rack 12.

Referring now to Figure 15, in this instance the hand-lever 1 is pivotally connected to the lever 42 through the medium of a pivot 41, the lower end of the said hand-lever contacting with an abutment 59 on the said lever 42 whereby a certain amount of lost motion is provided. The hand-lever 41 is provided with an extension 55 to carry the pawl 10, which is arranged to slide or reciprocate, a spring 51 being provided to maintain the same in contact with the rack 12. The hand-lever 42 is pivoted to the frame at 43 and communicates motion to the brakes through the rod 44 in the usual manner. In this construction it will be observed that when the hand-lever 1 is moved in the direction of the arrow the pawl 10 engages the rack 12 and the extension 55 contacts with the lever 42 whereby the same is caused to move to apply the brakes. Upon movement in a reverse direction the pawl 10 is first raised upwardly out of engagement with the rack 12 before the lower end of the lever 1 contacts with the abutment 59 on the lever 42. Both levers are then free to be moved to release the brakes.

From the foregoing description it will be evident that the brakes require the use of one hand only for their manipulation and that this can be effected from either side of the vehicle if two hand-levers be employed.

The braking operation is also effected smoothly without any tendency of the brake-lever itself to move under the reaction of the brakes.

The improved mechanism, moreover, is adaptable to existing hand-controlled brake gears and can be readily combined with power-controlled brakes if required.

Although the brake mechanism has been described more particularly for use with railway vehicles and on other cars it will be understood that it can be used in connection with the brake mechanism of other vehicles for common roads, of cranes, windlasses and other machines using brakes.

I claim:

1. Brake mechanism for vehicles comprising brake shoes, an operating lever, a series of levers and connecting rods connecting the shoes and operating lever, a fixed cam, a link engaging the cam to increase the leverage of the mechanism, a rack, a pawl or detent carried by the link and adapted to engage the rack to lock the link against movement in one direction, a connecting rod having a lost motion connection with the link, and adapted to release the pawl or detent on initial movement of the operating lever in the reverse direction.

2. Brake mechanism for vehicles comprising brake shoes, an operating lever, a series of levers and connecting rods connecting the shoes and operating lever, a fixed cam, a link engaging the cam to increase the leverage of the mechanism and relieve the operating lever from the strain of opposing forces, a rack, a pawl or detent carried by the link and adapted to engage the rack to lock the link against movement in one direction, a connecting rod having a lost motion connection with the link and arranged to release the pawl or detent on initial movement of the operating lever in the reverse direction.

FRANK ERIC DADD.